(12) United States Patent
Schultz et al.

(10) Patent No.: US 9,147,336 B2
(45) Date of Patent: Sep. 29, 2015

(54) METHOD AND SYSTEM FOR GENERATING EMERGENCY NOTIFICATIONS BASED ON AGGREGATE EVENT DATA

(75) Inventors: Paul T. Schultz, Colorado Springs, CO (US); Mark J. Hahn, Stow, MA (US); Robert A. Sartini, Colorado Springs, CO (US); Harrison Doung, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 13/408,451

(22) Filed: Feb. 29, 2012

(65) Prior Publication Data

US 2013/0222133 A1 Aug. 29, 2013

(51) Int. Cl.
| | |
|---|---|
| *G08B 1/08* | (2006.01) |
| *G08B 25/00* | (2006.01) |
| *G08B 25/01* | (2006.01) |
| *G08B 25/08* | (2006.01) |
| *G08G 1/00* | (2006.01) |
| *H04W 4/02* | (2009.01) |
| *H04W 4/20* | (2009.01) |
| *H04W 4/22* | (2009.01) |

(52) U.S. Cl.
CPC ............ *G08B 25/006* (2013.01); *G08B 25/016* (2013.01); *G08B 25/08* (2013.01); *G08G 1/205* (2013.01); *H04W 4/021* (2013.01); *H04W 4/20* (2013.01); *H04W 4/22* (2013.01)

(58) Field of Classification Search
USPC ...................................... 340/539.13; 709/218
See application file for complete search history.

(56) References Cited

U.S. PATENT DOCUMENTS

| | | | | |
|---|---|---|---|---|
| 6,989,745 | B1 * | 1/2006 | Milinusic et al. | 340/541 |
| 7,675,423 | B2 * | 3/2010 | Boling et al. | 340/573.1 |
| 8,024,330 | B1 * | 9/2011 | Franco et al. | 707/724 |
| 2005/0128075 | A1 * | 6/2005 | Aota | 340/539.1 |
| 2006/0092043 | A1 * | 5/2006 | Lagassey | 340/907 |
| 2006/0095199 | A1 * | 5/2006 | Lagassey | 701/117 |
| 2006/0235833 | A1 * | 10/2006 | Smith et al. | 707/3 |
| 2008/0109153 | A1 * | 5/2008 | Gueziec | 701/117 |
| 2011/0003577 | A1 * | 1/2011 | Rogalski et al. | 455/404.1 |
| 2011/0037605 | A1 * | 2/2011 | Robison et al. | 340/686.1 |
| 2012/0066345 | A1 * | 3/2012 | Rayan et al. | 709/218 |
| 2012/0072845 | A1 * | 3/2012 | John et al. | 715/738 |
| 2013/0281046 | A1 * | 10/2013 | Sennett et al. | 455/404.1 |

\* cited by examiner

*Primary Examiner* — Naomi Small

(57) ABSTRACT

An approach for enabling event notifications to be directed to one or more contacts based on the acquiring of common event data by one or more wireless devices is described. A multimedia event processor receives event data corresponding to an event from a mobile device. The event data is associated with a tag for describing the event data and classified as corresponding to a level of severity based on the tag. A target destination is then determined for transmission of a notification message, the event data, or a combination thereof.

18 Claims, 9 Drawing Sheets

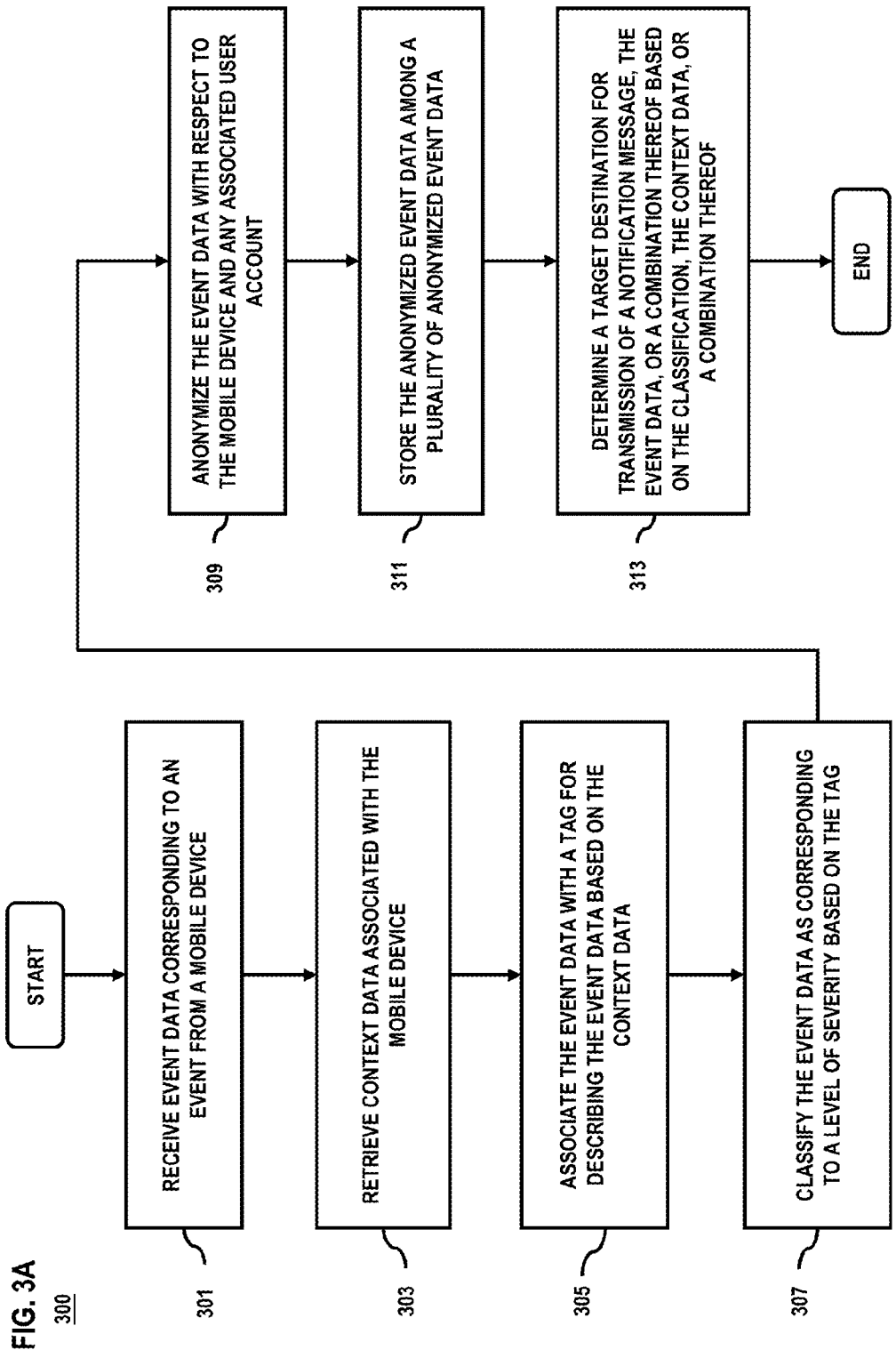

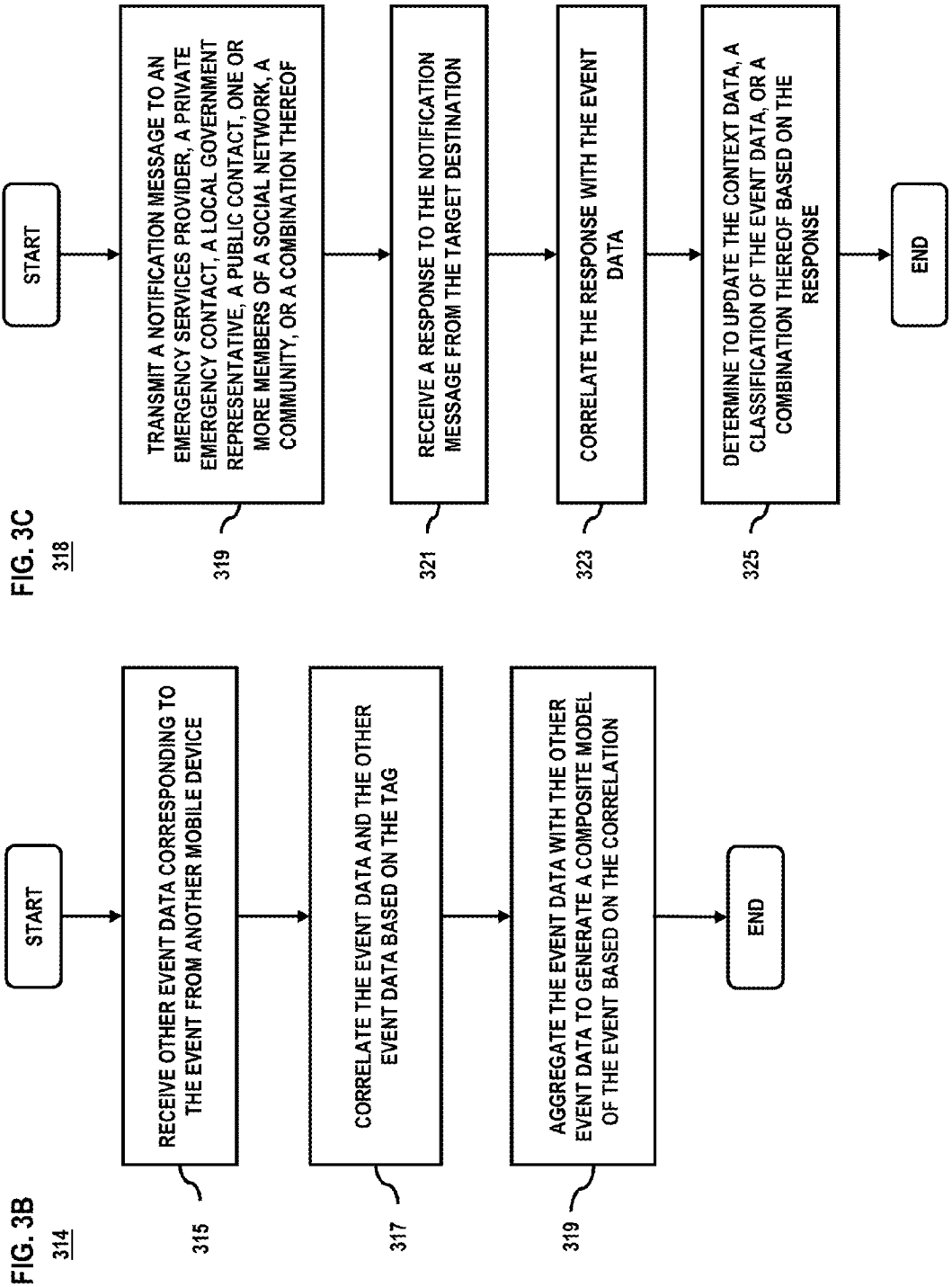
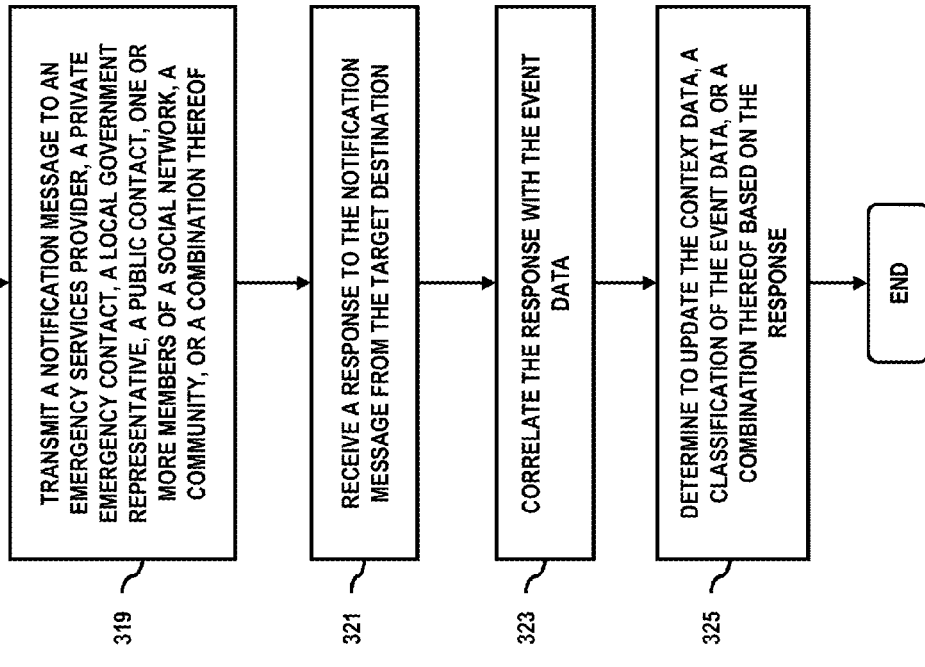

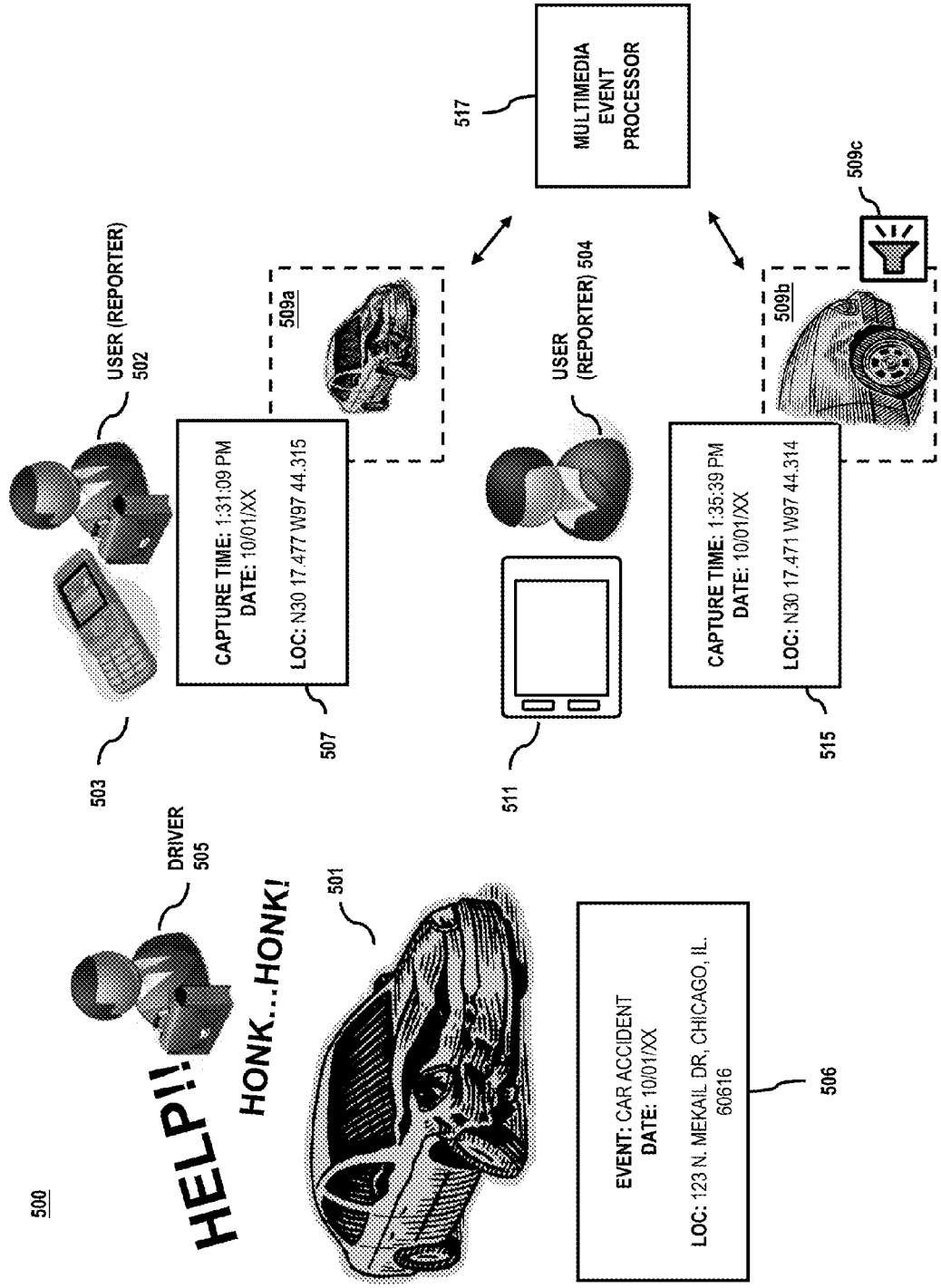

FIG. 5B

METHOD AND SYSTEM FOR GENERATING EMERGENCY NOTIFICATIONS BASED ON AGGREGATE EVENT DATA

BACKGROUND INFORMATION

Modern telecommunications services, particularly wireless mobile communication devices, have proved to be effective public safety tools. For instance, during emergencies, these devices (e.g., smartphones) are indispensable for contacting the appropriate people or authorities. In addition, such devices can be useful for acquiring audio, video or other multimedia or textual data related to the emergency event by way of integrated capture tools such as cameras, video and audio recorders, keyboards, etc. By way of example, when a vehicle accident occurs at a busy thoroughfare, some device users at or near the scene of the accident may capture a video of the accident using a video recorder at their device. Others at or near the scene may snap pictures using an integrated camera or post messages regarding the event to a social networking site. Unfortunately, such data remains isolated to the users.

Based on the foregoing, there is a need for enabling event notifications to be directed to one or more emergency contacts based on the acquiring of common event data by one or more wireless devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3C are flowcharts of processes for enabling event notifications to be directed to one or more contacts based on the acquiring of common event data by one or more wireless devices, according to various embodiments;

FIG. 5A is a diagram depicting an interaction between a multimedia event processor and one or more user devices, according to one embodiment;

FIG. 5B is a diagram of a user interface for enabling user interaction with the multimedia event processor, according to one embodiment;

DESCRIPTION OF THE PREFERRED EMBODIMENT

An apparatus, method and software for enabling event notifications to be directed to one or more emergency contacts based on the acquiring of common event data by one or more wireless devices is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to emergency notifications, it is contemplated that these embodiments have applicability to any data protocols, methodologies or systems for generating alerts, alarms, emergency broadcasts, communication signals and the like. Furthermore, while the exemplary embodiments are described from the perspective of high priority events, such as those requiring some form of emergency response, it is contemplated these embodiments have applicability to non-emergency events as well. This includes, for example, social events, community events, business events, special occasions, and the like.

Figure 1:
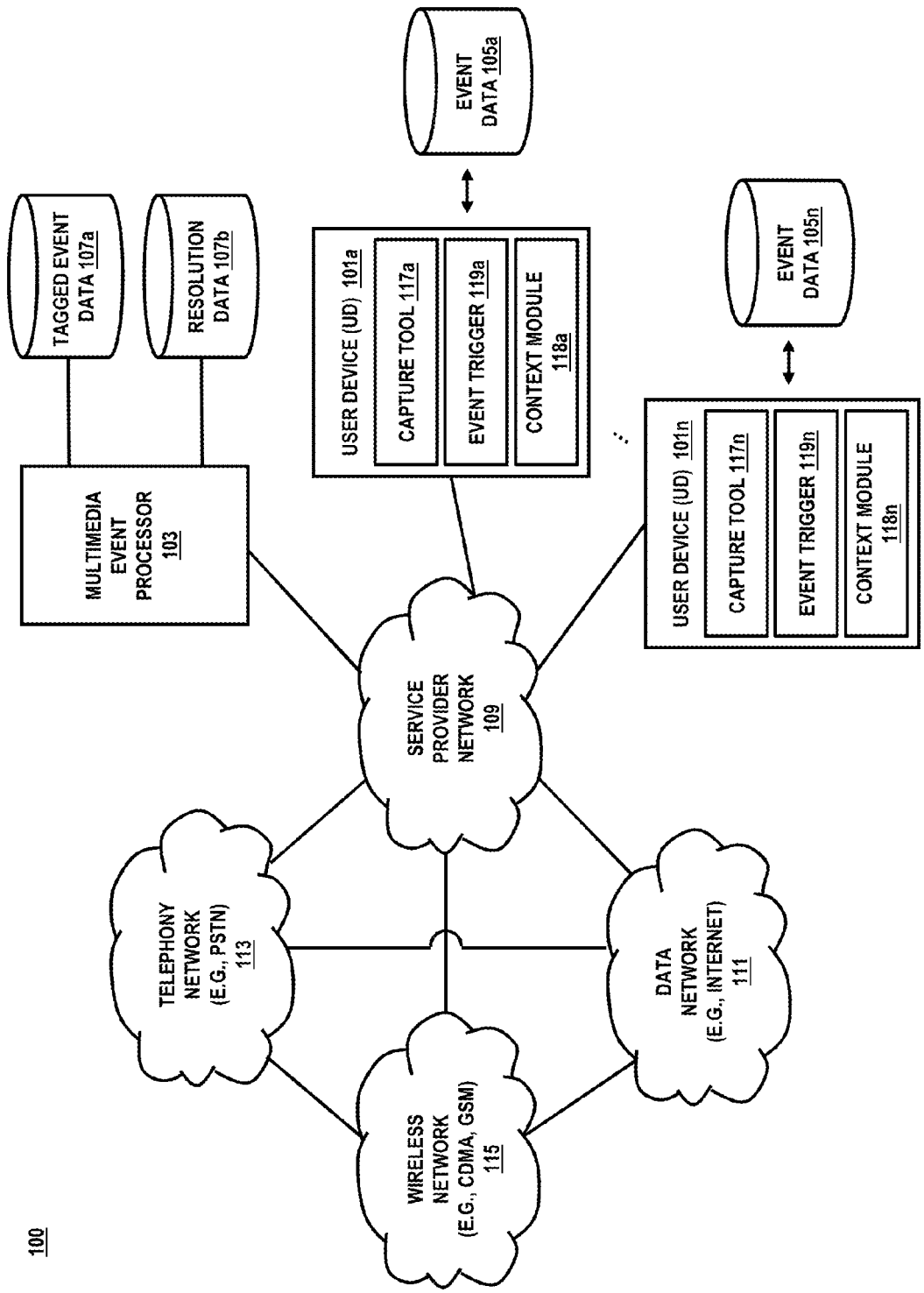
FIG. 1 is a diagram of a system for enabling event notifications to be directed to one or more contacts based on the acquiring of common event data by one or more wireless devices, according to one embodiment.

FIG. 1 is a diagram of a system for enabling event notifications to be directed to one or more contacts based on the acquiring of common event data by one or more wireless devices, according to one embodiment. For the purposes of explanation, system 100 is shown to include one or more user devices 101a-101n (e.g., mobile device, smart phone, tablet, netbook, laptop, sensor, set-top box, or any communications enabled computing device), which are configured to communicate with a multimedia event processor 103 to share event data 105a-105n. The multimedia event processor 103 processes the event data 105a-105n to perform various executions, including for example: (1) determining a correlation between the event data 105a-105n of the different devices 101a-101n; (2) associating one or more tags with the event data 105a-105n for representing an event type to which the event data relates or a description of one or more elements of the event data; and (3) initiating a communication with an emergency contact appointed by the user based on the event data 105a-105n. The emergency contact may include, for example, an emergency service responder, a designated/trusted individual, a group or community of individuals, or a combination thereof. Also, event data may be exchanged with or posted to various contacts on an anonymous basis.

Event data 105a-105n may include, for example, any data sensed, acquired or otherwise captured by a capture tool 117a-117n of a given user device 101a-101n in relation to, or at a point in time of, occurrence of a given event. Capture tools 117a-117n available to respective user devices 101a-101n include, for example, integrated camera devices, audio recorders, video recorders, GPS, accelerometers, compasses, gyros, proximity sensors, barometers, keyboards and terminals, or any other devices for activating the various sensory/input mechanisms of the device 101a-101n. As a result, event data 105a-105n is acquired or sensed as audio data, video data, GPS data, light data, motion data, image data, textual data, orientation data, barometric data, or a combination thereof.

User devices 105a-105n featuring the above described capture tools 117a-117n have become the default means of recording and capturing event data. Mobile devices, such as cell phones and tablet computers for example, have become a viable alternative to standalone tape recorders, cameras and camcorders. This is attributable to the portability, network access capability and ease of use of the user devices over bulky, individual equipment. At any given moment, these devices allow users to quickly record data regarding events occurring in their proximity, including emergency and non-emergency events. This data may then be subsequently shared with friends by way of e-mail, mobile application, or short simple messaging (e.g., SMS or MMS), posted to various websites, uploaded to a cloud-based data stores, etc., via transmission over a service provider network 109. This capability is especially useful in supporting the capture of event data related to high priority situations such as accidents, crime, natural disasters, political and social occurrences (e.g., protests and unrest), etc.

Typically, high priority events, including those requiring the aid of emergency responders (e.g., police, military, and fire safety) are captured by disparate device users from different vantage points. By way of example, a hostage situation unfolding in a shopping mall may be captured on video by multiple different users dispersed throughout the mall while other users positioned elsewhere, but within view snap pictures as the hostage event unfolds. Each of the individual device users capture information that is useful for providing details regarding the occurrence. Unfortunately, there is currently no coordinated system for enabling coordinated aggregation of data as captured by disparate users relative to a common event. Consequently, emergency service providers are limited in their ability to be promptly notified of such events as they occur in real-time.

To address this issue, system 100 presents a multimedia event processor 103 that is configured to determine a correlation between captured event data and subsequently initiate a communication with one or more contacts based on the determined event type. The contacts may include one or more members of a community, wherein the communication is directed to the various contacts en mass. Furthermore, there is currently no means of automatically notifying emergency responders, such as police, or other contacts based on the aggregation of common event data. Alternatively, the multimedia event processor 103 may be directed to generate targeted communications to select one or more contacts related to a particular device user. In certain embodiments, the communication may be established over a network, such as service provider network 109 for the purpose of transmitting a notification message, placing of a phone or video call, exchanging event data, or a combination thereof. By way of example, the notification message may include details regarding the event, the event data, location information pertaining to the event, a request for action by the contact, a distress signal, or a combination thereof. Still further, the notification message may be in the form of an alarm signal, textual message, graphic, video, vibration signal, or the like.

Event types may include, for example, any information, descriptor, symbol or other data for representing the category, name, scheme or description to which the event pertains. In certain embodiments, the event type is determined by the multimedia event processor 103 based on the application of one or more data recognition techniques as performed in connection with one or more analytic processing models. Thus, as event data 105*a*-105*n* is retrieved from user devices 101*a*-101*n* in audio, video, textual, numeric, or graphic form, the multimedia event processor is configured to perform audio, video, textual, numeric, or image recognition processing respectively on the event data. One of more pattern detection, heuristic analysis, inference or deductive processing, object matching, ontological schemes, and other analysis models are employed for directing the audio, video, image, numeric, or text recognition process; the recognition being performed to render a determination as to a predetermined type to which the event data may be associated. It is noted that the predetermined types are extensible such that processor 103 "learns" new patterns that can be classified and appear as a new type; for example, a group of people witnessing and capturing data (such gathering may be classified, e.g., as a coup, a riot, a demonstration, etc.). Also, the "volume" of event data submitted may trigger the event processor 103 to determine whether the event is significant. However, an event, such as a car crash, is significant in a different way from a movement, yet both are likely to be captured and possibly treated differently by the processor 103.

By way of example, in the aforementioned hostage event scenario, image data representative of a gun may be submitted by way of a first user device 101*a* that is equipped with a camera (e.g., capture tool 117*a*). The image data is queued, or flagged as requiring processing by the multimedia event processor on the basis of an event trigger 119*a*. The event trigger is a software and/or hardware based button, switch, gesture, mobile application determined (e.g., sudden unusual movement detected by accelerometer, indication signaled by a nearby mobile device) or other command for alerting the multimedia event processor 103 of incoming event data from the user device 101*a*. Once transmitted, the image data is then processed by the multimedia event processor 103 based on one or more pattern/object recognition techniques such that an object within the image corresponding to a type or category of "GUN" is identified. Furthermore, audio signal data relating to the same event may be analyzed and compared against known sound data for determining that a given subset of the data corresponds to a gunshot. Again, in this instance, the audio signal may therefore also be labeled with respect to the type or category of "GUN" accordingly. It is noted, therefore, that the various event types may include, for example, a determined broad category or descriptor of an event or object related thereto, a sub-category of an event or object related thereto, a specific object type, a reference name or identifier, a full description or definition, and any other tag for characterizing the event data and/or the event related thereto. Event type data is therefore associated with the event data 105*a*-105*n* as one or more tags and is stored as tagged event data 107*a* by the multimedia event processor 103. In one embodiment, event tagging can happen at multiple levels: by device, at event processor 103 when received, at processor 103 as additional events and context are received (either by other mobiles of from external sources like RSS feeds, Internet breaking news, etc.). It is contemplated that events can be tagged by the multimedia event processor 103 and/or the capture function on the mobile device 101*a*. A hierarchical relationship can be defined such that the capture function of the device 101*a* "tags" based on what the device 101*a* knows, while the multimedia event processor "tags" based on its collection of algorithms; and then as correlation and aggregation takes place, yet another opportunity to "tag" the events can occur because now the system is starting to understand and learn what is occurring.

To enable the appropriate storing of tagged event data 107*a*, the multimedia event processor is also configured to determine a correlation between the various event data 105*a*-105*n* as received from the user devices 101*a*-101*n*. This correlation process is performed, at least in part, on the basis of a match being identified between one or more tags associated with the event data 105*a*-105*n*, a match being identified between relative context information associated with the event data 105*a*-105*n*, or a combination thereof. User device 101 may automatically tag event data (e.g., include GPS coordinates and/or facial recognition indicators with image data, include voice recognition and/or voice biometric indicators with audio data, etc.). In certain embodiments, the tags may also include or be associated with context information pertaining to the event data 105*a*-105*n*. By referencing the context information, the event data 105*a*-105*n* as received by the multimedia event processor in various forms (e.g., audio, video, textual) from disparate data sources (e.g., user devices 101a-101n), may be catalogued/stored in common.

By way of example, in the above described hostage scenario, context information pertaining to the image data and audio data tagged as "GUN" is further evaluated by the multimedia event processor 103 to determine if a correlation exists between the commonly tagged data. This evaluation may include, for example, a comparison of location data, position data, motion data, activity data, time data, environmental data, and other types of context information. In the case of the hostage scenario, this would include determining respective event data has common time and date information, a shared location corresponding to the shopping mall, etc. When a match is determined to exist between the context information of the different but commonly tagged event data 107a—i.e., to within a predetermined threshold—the event data is deemed to correlate. Alternatively, when context information for different event data is not determined to be within the predetermined threshold, the event data is deemed to not correlate. By determining correlation, the multimedia event processor is able to store common/related event data in reference to one another, while event data 105 determined not to correlate is stored without reference to any other event data. In the latter case, this corresponds to the cataloguing of original event data, of an unknown type or that has no composite match with other event data to within the predetermined threshold. As will be discussed more fully later, the process of correlating the event data 105a-105n enables the multimedia event processor 103 to maintain distinct records of events for archiving, knowledge base development, reporting and event modeling purposes. In addition, event data 105a-105n that is commonly tagged but related to distinctly different events is appropriately stored.

Context information may include, for example, any data for representing a location, position, orientation, date/time, means of execution, associated activity, modality, state, etc., of an event, the event data 105a-105n, the one or more user devices 101a-101n, a user of the respective user devices 101a-101n, or a combination thereof. In certain embodiments, context information 'feeds' may also be flowing in to the multimedia event processor 103 from various sources to help in establishing contexts within which to evaluate and tag events. For example knowledge that sports events are taking place in a particular geographical region is valuable, but other events (e.g., political events, scheduled events of any kind and the like) are also useful base level information that are accessible for event recognition and correlation. Also, RSS feeds and the like can be utilized by the event processor 103.

The multimedia event processor 103 is configured to analyze the context information relative to a given set of event data as a means of further characterizing an event. It is noted, therefore, that the context information may be employed in generating the one or more tags to be associated with a given event. In certain embodiments, context information is generated or determined by a context module 118a-118n operable at the user devices 101a-101n. The context module 118a-118n controls the execution of various sensors of the device for acquiring context information, including global positioning sensors, network detection sensors, gyroscopes, motion detectors, time sensors, and other data acquisition devices. By way of these sensors, the context module 118a-118n detects location information (e.g., longitude and latitude, geospatial coordinates, building coordinate data), device and/or user position and/or orientation information, time zone, time and date information, network connectivity information (e.g., IP Address, network connection status, location area identity), user and/or device profile information (e.g., service-subscriber key, user identifier, serial number), or a combination thereof. Alternatively or additionally, context information may be determined and/or supplemented by information available from service provider network (e.g., cell sector) and/or from the Internet (e.g., social network information).

In certain embodiments, the multimedia event processor 103 is configured to determine a level of severity of the event data. For example, in the above described hostage scenario, heuristic data analysis and other processing of the image of the gun may be performed. Under this scenario, when it is determined the images contain what appears to be a gun, a level of severity of 'High Priority' is assigned to this particular event data and other related event data. As another example, when the image is determined to contain image data representative of fire, smoke, explosions, etc., this also indicates a severity of 'High Priority.' In the case of the sound data, a determination that the sound data is an explosion, gunshot, cry for help, etc., is also deemed of 'High Priority' severity. Low priority severity may be assigned or correlated with event data deemed to be insignificant in scope, inconsequential relative to the event data/context information, undeterminable, etc. The level of severity may be determined and assigned to the event data 105 or tagged event data 107 in connection with the event data tagging process or as a further aspect of the correlation process.

As noted earlier, level of severity or interest in a given event may also relate to the "volume" of data for a given geographic region for a given time range (e.g., increased volume of video or photos showing up around the time of an earthquake, or a major gathering either for a sports related event such as a championship celebration or a gathering related to a political uprising, etc.). In one embodiment, thresholds may be established and/or learned over time to establish severity or "pay attention" criteria for a given series of events. For example, a gun or a fire in a video or a photo may always be high priority and deserve attention, whereas "n" photos (e.g., 10, 50, 100, 500) or videos emanating from a geographic region are likely to be of great interest.

It is noted, therefore, that the level of severity corresponds to a type of response action to be initiated or performed by the multimedia event processor 103 relative to the event type. The response actions enabled by the multimedia event processor 103 as it engages a user device on the basis of event data 105 or tagged event data 107 may be classified under various categories. These response actions are described, by way of example, with respect to TABLE 1 below:

TABLE 1

| Response Action | Description |
| --- | --- |
| Intelligent Control | Permits the multimedia event processor 103 and/or a remote computing device to seize control of the user device 101 that activated the event trigger 119. Intelligent control may be performed, for example, by an emergency responder (e.g., emergency 911 operator) in cases where the device user is incapacitated, unable to respond, or fails to response. By way of |

TABLE 1-continued

| Response Action | Description |
| --- | --- |
| | example, the control may enable remote activation and control of various device sensors and/or capture tools (e.g., camera), etc. As another example, a keep-alive and dead-man switch may be activated on the basis of a user response failure or determined environmental context of the user (e.g., a college student walking to their dorm late at night). |
| Intelligent Notification | Permits the multimedia event processor 103 to generate notification messages, including text messages, alert signals, e-mail communications, phone calls, video calls, and other message types based on a determined level of severity of the event. The messages may be tailored to the specific contact to be notified (e.g., Police, ambulatory service provider, spouse). Notifications may also include signals for generating a triggering message-i.e., triggering an alarm at the device 101, the triggering of an external alarm (e.g., a car horn), the activation of a device tracking signal for notifying a contact of the location of the device 101, etc. |
| Intelligent Event Routing | Permits the multimedia event processor 103 to route and direct notification messages to one or more user designated contacts based on the level of severity (e.g., High Priority, Low Priority, etc.) as assigned to a set of commonly tagged event data 107a. Routing is performed based on event or recipient context, policy preferences, notification subscriptions with the multimedia event processor 103, etc. Intelligent event routing also includes the directing of event data, i.e., tagged event data 107a, for storage to a knowledge base. |

The user of a device 101a-101n, which is configured to interact with the processor 103, may establish one or more policies for affecting performance of the above mentioned response actions. This may include the establishment of policies for affecting the routing and/or sharing of messages based on event classification/type and context, the type and capabilities of the target notification device(s), user device capabilities, network intelligence and capacity, etc. The policy also enforces security and privacy settings as well, including user selection of which personal or private information to share with a contact (e.g., the police), event data storage and history settings and knowledge base recording settings. The multimedia event processor 103 may be configured to perform various anonymization techniques for processing the event data based on the policies.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone, wearable computer, sensor, or any combination thereof. It is also contemplated that the devices 101a-101n can support any type of interface for supporting the presentment or exchanging of data. In addition, user devices 101a-101n may facilitate various input means for receiving and generating information, including touch screen capability, keyboard and keypad data entry, cameras, voice-based input mechanisms and the like. Other implementations of user devices 101 are applicable.

In certain embodiments, user devices 101a-101n, the multimedia event processor 103, and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, Internet protocol multimedia subsystem (IMS), or other suitable infrastructure to support control and signaling functions.

According to exemplary embodiments, end user devices (not shown) may be utilized to communicate over system 100 and may include any customer premise equipment (CPE) capable of sending and/or receiving information over one or more of networks 109-115. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Additionally, CPE may include environmental sensors and/or capture devices (e.g., video surveillance cameras at the mall in the previous example) that can provide additional data for use by multimedia event processor 103. Further, computing device may be any suitable computing device, such as a VoIP phone, skinny client control protocol (SCCP) phone, session initiation protocol (SIP) phone, IP phone, personal computer, softphone, workstation, terminal, server, etc.

Figure 2:
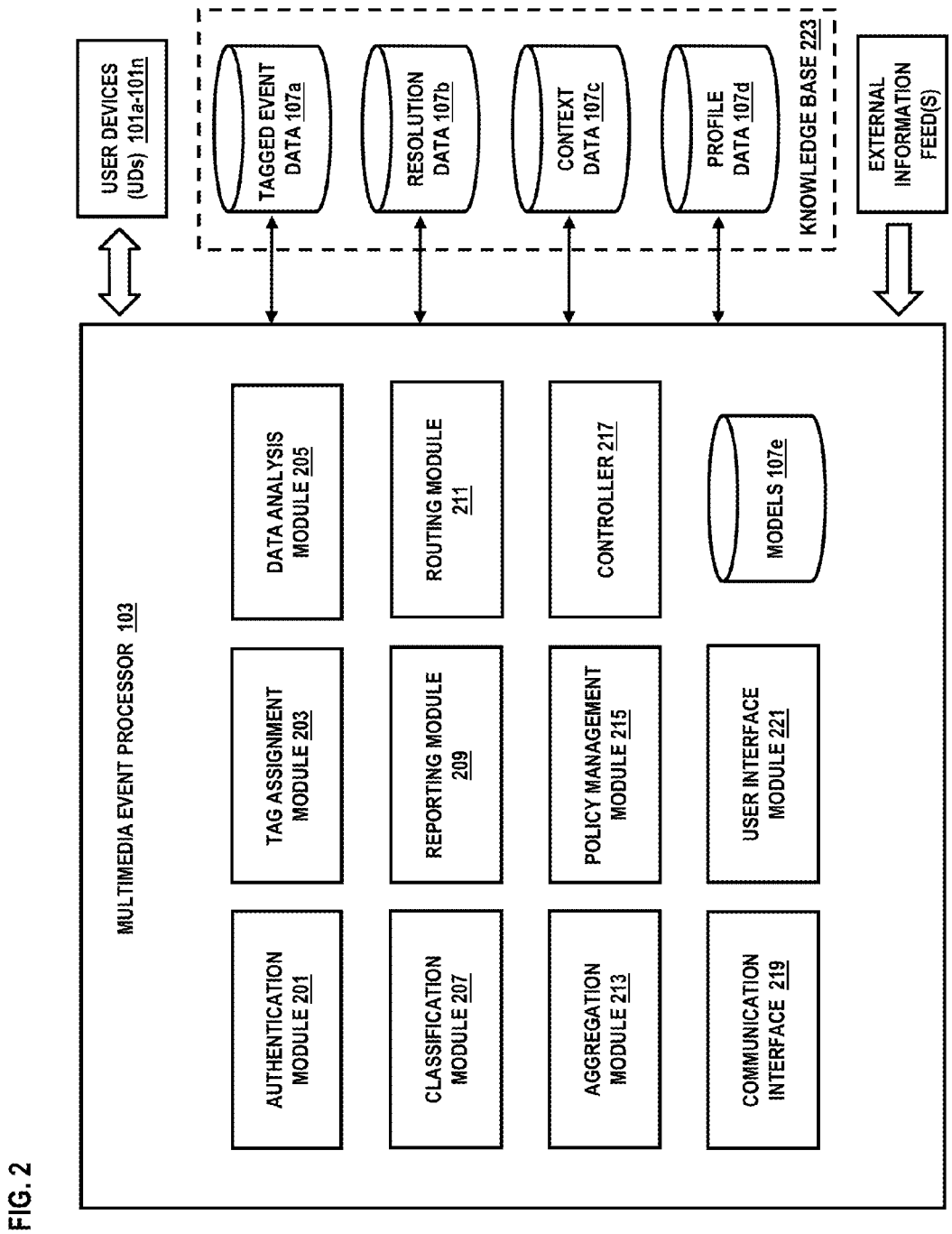
FIG. 2 is a diagram of a multimedia event processor, according to one embodiment.

FIG. 2 is a diagram of a multimedia event processor, according to one embodiment. The multimedia event processor 103 includes various executable modules for performing one or more computing, data processing and network based instructions that in combination provide a means for enabling event notifications (e.g., regarding pertinent community events) to be directed to one or more emergency contacts or community/group members based on the acquiring of common event data by one or more wireless or wired devices. Such modules can be implemented in hardware, firmware, software, or a combination thereof. By way of example, the multimedia event processor 103 may include an authentication module 201, tag assignment module 203, data analysis module 205, classification module 207, reporting module 209, routing module 211, aggregation module 213, policy management module 215, controller 217, communication interface module 219 and user interface module 221.

In addition, the multimedia event processor 103 also accesses tagged event data from a database 107*a* for maintaining event data already tagged subject to analysis. A context database 107*c* is also maintained for storing context information as provided by the various user devices 101*a*-101*n* in communication with the multimedia event processor 103. Also, a resolution database 107*b* is also maintained for storing logs regarding the response actions taken by one or more contacts in response to a given notification. Still further, a profile database 107*d* is maintained for storing one or more user profile settings, privacy settings, subscription information, event management settings, privacy and data sharing policies and other data for regulating execution of the multimedia event processor 103 relative to a given user and/or device. It is noted that data from databases 107*a*-107*d* may be further maintained or archived as part of a collective knowledge base. In certain embodiments, the knowledge base may be analyzed for refining one or more models to be used for evaluating and responding to emergency/high priority events.

In one embodiment, an authentication module 201 authenticates users and user devices 101*a*-101*n* for interaction with the multimedia event processor 103. By way of example, the authentication module 201 receives a request to subscribe to the multimedia event processor, such as according to a service agreement, for enabling automated event notifications to be generated based on event data. The subscription process may include the establishment of user preferred preferences, including designated emergency contacts (e.g., emergency responders, individuals and communities/groups), mode of event notification (e.g., SMS, MMS, Push Notification, phone call, video call), personal information sharing policies, etc. In the latter example, this enables the user to maintain a level of anonymity and privacy when they share event data with authorities, emergency responders, community members or other contacts. The user preferences may also include various event notification settings, including alarm intensity, auto dial parameters, workflow management settings, etc.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the multimedia event processor 103 (e.g., as enabled by user interface module 221). Registration data 217 for respective subscribers, which contains pertinent user or device profile data, may be cross referenced as part of the login process. Alternatively, the login process may be performed through automated association of profile settings maintained as registration or profile data 107*d* with an IP address, a carrier detection signal of a user device, mobile directory number (MDN), subscriber identity module (SIM) (e.g., of a SIM card), near field communication (NFC) identifier, radio frequency identifier (RFID) tag or other identifier.

It is noted that the authentication module 201 is configured to operate in conjunction with a policy management module 215. The policy management module 215 is configured to render a policy configuration interface for supporting user adaptation of their various privacy, data sharing and event management settings. Users may also select to opt-in to receive event notifications from other users who have designated them as a contact or from the multimedia event processor 103 when events the user may be interested in (e.g., emergency events in close proximity to the user) occur. This includes, for example, a group or community based opt-in option for enabling event notifications to be directed to multiple users in common. Both the authentication module 201 and policy management module 215 are executed from the perspective of the senders of event data as well as recipients of event notifications. As such, preferences, settings and policy information may be referenced to a specific user, user device, or combination thereof, and maintained as in connection with profile data 107*d*.

In one embodiment, the tag assignment module 203 associates one or more tags to event data as received from one or more user devices 101*a*-101*n*. Event data is conveyed to the tag assignment module 201 by an aggregation module 213. Once received, the tag assignment module generates the tags based on an analysis of the received event data, such as by way of one or more image, text, sound or other data recognition techniques performed by a data analysis module 205. Tags are generated to represent an event type to which the event data relates or a description of one or more elements of the event data. By way of example, an image depicting an erupting volcano may feature various tags including, "Ash," "Lava," "Volcano." Context information as provided by the user devices 101*a*-101*n*, or in some instances as determined based on historical information for a given user, may also inform the generation of tags. For example, in the case of the erupting volcano, additional tags may indicate the location of the occurrence, a name associated with the event, external or third-party news feed data related to the image, etc. As such, an external data feeds module (not shown) can acquire other sources of information (e.g., external information feeds) to use to support the various recognition and correlation tasks. In essence, "knowledge-base" for the multimedia event processor 103 can stem from external data feeds. The multimedia event processor 103 can be creating or augmenting tags based on auxiliary data feeds from other sources to assist with recognizing events. For example, a news feed may be confirming that a volcano did erupt at some location (e.g., latitude/longitude) and date/timestamp; and thus all data flowing from that location and/or at that time are candidates to be associated with that externally fed event).

It is noted that the data analysis module 205 operates in connection with the tag assignment module 203 to determine and assign tags that accurately represent the provided data. In one embodiment, the data analysis module 205 employs various pattern detection, heuristic analysis, inference or deductive processing, object matching, ontological schemes, and other analysis models for directing the audio, video, image, numeric or text recognition process. This execution is performed in connection with one or more models 107e, which may include for example data, framework, schemas, mappings, characteristic sets, tables and other information for enabling the event to be recognized. The models may be based on historic data regarding an event type, and is capable of refinement over time as additional data is aggregated by the aggregation module 213.

In one embodiment, a classification module 207 operates in connection with the tag assignment module 203 to classify tagged event data. By way of example, the classification module 207 classifies the event according to a level of severity based on the one or more assigned tags. The severity level (classification) may include, for example, a High Priority or Low Priority classification. Low priority severity may be assigned or correlated with event data deemed to be insignificant in scope, inconsequential relative to the event data/context information, undeterminable, etc. High priority severity may be assigned or correlated with the event data when it is deemed to convey emergency events or episodes.

The classification module 207 is also configured to anonymize the event data in accordance with one or more policies established by the user. As such, the anonymization process may be coordinated with the authentication module 201. By way of example, anonymization of the event data includes any techniques for obscuring important attributes, functions or structures of the data. This includes, for example, details about the various device users that capture event data, geographic and network location information, organization, names, passwords, and other personal information. In certain embodiments, the classification module 207 may employ techniques such as partial hiding, random permutation, prefix-preserving permutation, hashing, etc.

In one embodiment, a reporting module 209 is configured to receive an event trigger alert signal from the one or more user devices 101a-101n by way a software and/or hardware based event trigger (e.g., panic button). Alternatively, the event trigger may also include a signal for indicating a failure on the part of the user to respond to an emergency contact, the multimedia event processor 103, etc. In response to the signal, the reporting module 209 initiates the processing and analysis of event data received in connection with the sending device 101. In addition, the module 209 generates notification messages, including text messages, alert signals, e-mail communications, phone calls, video calls and other message types based on a determined level of severity of the event. The messages may be tailored to the specific contact to be notified (e.g., Police, ambulatory service provider, spouse). Signals may also be generated by the module 209 for triggering an alarm at the device 101, an external alarm (e.g., a car horn), the activation of a device tracking signal for notifying a contact of the location of the device 101, etc. It is noted, by way of example that one or more operations of the reporting module 209 correspond to the Intelligent Notification response action of TABLE 1.

The reporting module 209 also triggers activation of a routing module 211. In one embodiment, the routing module 211 permits the multimedia event processor 103 to route and direct notification messages to one or more user designated contacts based on the level of severity (e.g., High Priority, Low Priority, etc.) as assigned to a set of commonly tagged event data 107a. Routing is performed based on event or recipient context information (e.g., location, activity type), policy preferences (e.g., preferred personal contact), notification subscriptions with the multimedia event processor 103, etc. The routing module 211 also directs event data, i.e., tagged event data 107a, for storage to a knowledge base. It is noted, by way of example that one or more operations of the routing module 209 correspond to the Intelligent Event Routing response action of TABLE 1.

The reporting module 209 is also configured to receive resolution data from one or more contacts in response to the transmission of one or more event notifications. The resolution data 107b includes any information for indicating a response by a designated contact to aggregated, commonly tagged event data. This includes, for example, a determined non-response, a dispatch of an emergency responder, placement of a call to a family member, sending and/or publishing of a notification to one or more contacts at a social network, data for indicating a response time, instructions provided to the user, etc. As noted, the resolution data 107b, or portions thereof, may be added to a knowledge base 223 for analysis by the provider of the multimedia event processor service, the user, or the various contacts for response improvement purposes, defining more accurate event models 107e, etc.

In one embodiment, a controller 217 regulates the communication processes between the various other modules for enabling automated event notification and response. For example, the controller module 217 generates the appropriate signals to control the communication interface 219 for facilitating transmission of event data, resolution data, and other information over the network, e.g., service provider network 109. Also, the controller 217 permits the multimedia event processor 103 and/or a remote computing device to seize control of the user device 101 that activated the event trigger. Control may be performed, for example, by an emergency responder (e.g., emergency 911 operator) in cases where the device user is incapacitated or unable to respond. By way of example, one or more operations of controller 217 correspond to the intelligent control response action of TABLE 1.

By way of example, the controller 217 also enables remote activation and control of various device sensors, such as a GPS sensor, various capture tools (e.g., camera), etc. Still further, a keep-alive and dead-man switch may be activated on the basis of a user response failure or determined environmental context of the user (e.g., a college student walking to their dorm late at night). In certain implementations, the controller functions as a transceiver for enabling two-way interaction between a designated controller and the user device relative to a communication interface 219.

In one embodiment, a communication interface 219 enables formation of a session over a network 109 between the multimedia event processor 103 and the capture tool at the user device. By way of example, the communication interface 219 executes various protocols and data sharing techniques for enabling collaborative execution between a subscriber's user device 101a-101n (e.g., mobile devices, laptops, smartphones, tablet computers, desktop computers) and the multimedia event processor 103 over the network, e.g., service provider network 109. By way of example, the communication interface 219 is configured to enable event data and subsequent resolution result data to be delivered via public or private networks. It is noted that the private network offers greater security and end-user identity and privacy control, while the public network can support communications with third party services, such as social networks.

In one embodiment the user interface module 221 enables presentment of a graphical user interface for presenting the service offering. By way of example, the user interface module 221 generates the interface in response to application programming interfaces (APIs) or other function calls corresponding to the browser application or web portal application of the user devices 101a-101n; thus enabling the display of graphics primitives. Of note, the browser session may support execution of multimedia playback in response to tagged event data.

The above presented modules and components of the multimedia event processor 103 can be implemented in hardware, firmware, software, or a combination thereof. Though depicted as a separate entity in FIG. 1, it is contemplated that the processor 103 may be implemented for direct operation by respective UEs 101a-101n. By way of example, the one or more modules 201-221 may be implemented for operation by respective user devices as a multi-input processor 103, or combination thereof. As such, the multimedia event processor 103 may generate direct signal inputs by way of the operating system of the UE for interacting with the capture tool 117, event trigger 119 and context module 118.

Figure 7:
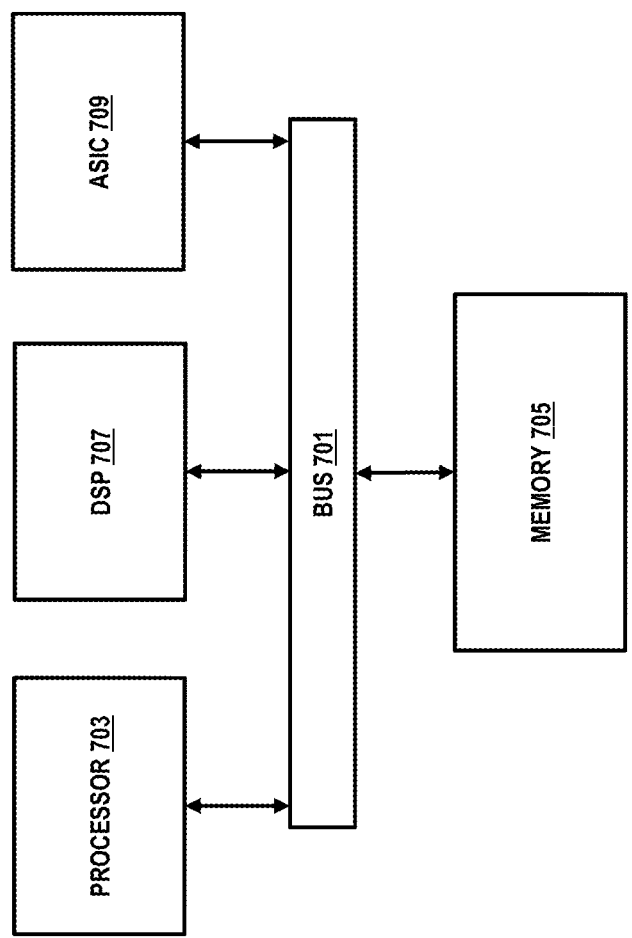
FIG. 7 is a diagram of a chip set that can be used to implement an embodiment of the invention.

FIGS. 3A-3C are flowcharts of processes for enabling event notifications to be directed to one or more contacts based on the acquiring of common event data by one or more wireless devices, according to various embodiments. In one embodiment, the multimedia event processor 103 performs processes 300 and is implemented in, for instance, a chip set including a processor and a memory as shown in FIG. 7. In steps 301 and 303, the multimedia event processor 103 receives event data corresponding to an event from a mobile device and retrieves context data associated with the mobile device respectively. Alternatively, processor 103 can receive contextual data (e.g., news feeds) to establish its own context within which to evaluate events. As noted previously, the context data may include location information, user profile information, activity information, etc. In another step 305, the multimedia event processor associates the event data with a tag for describing the event data based on the context data. Tags are generated by the processor 300 for association with event data (i.e., text, numeric, audio or video data) based on one or more models. Per step 307, the event data is then classified as corresponding to a level of severity based on the tag. The level of severity may be determined and assigned to the event data 105 in connection with the event data tagging process of step 305 or as a further aspect of the correlation process. Also, the level of severity may be determined based on the tag as well as on other information within the multimedia event processor 103.

In step 309, the multimedia event processor 103 anonymizes the event data with respect to the mobile device and any associated user account. The anonymization may be performed in accordance with a privacy and/or data sharing policy of the multimedia event processor. As noted, the anonymization affects the routing and/or sharing of messages based on event classification/type and context, the type and capabilities of the target notification device(s), user device capabilities, network intelligence and capacity, etc. The anonymization also restricts the sharing of personal or private information with a contact (e.g., the police) or a community at large. In certain embodiments, the processor 103 preserves the raw data (i.e., securely maintained) and anonymizes for distribution or reporting purposes.

Per step 311, the multimedia event processor 103 stores the anonymized event data among a plurality of anonymized event data. In another step 313, the processor 103 determines a target destination for transmission of a notification message and/or the event data related thereto. The target destination may include, for example, a network location of a communication system of an emergency contact. A determination is made of which target destination to transmit a notification based on the classification and/or the context data accordingly. For example, a high priority classification may result in transmission of the event data to an emergency services provider while a low priority classification may be directed to a personal contact (e.g., friend) or various members of a community.

In step 315 of process 314 (FIG. 3B), the multimedia event processor 103 receives other event data corresponding to the event from another mobile device. This may include event data in addition to those from other mobile devices. That is, data (other than those from the other mobile device), e.g., RSS/news feeds, can be used in the correlation and event determination step. The event data is then correlated with the other event data (as well as data not from the other mobile device) based on the tag, and aggregated with the other event data to generate a composite model of the event based on the correlation. This corresponds to steps 315 and 317 respectively. The composite model may include a set of empirical, historical and experiential data for classifying an event, circumstances related to the event, response characteristics, etc.

In step 319 of process 318 (FIG. 3C), the multimedia event processor 103 transmits a notification message to an emergency services provider, a private emergency contact, a local government representative, a public contact, one or more members of a social network, a community, or a combination thereof. As noted, a target destination to which the notification is transmitted may include an e-mail address, a universal resource identifier (URI), a communication handle, a phone number or other contact means. In another step 321, the multimedia event processor 103 receives a response to the notification message from the target destination. The response may be provided by the emergency contact for indicating a course of action taken responsive to the event data. By way of example, an ambulatory service provider may provide information regarding response times, emergency actions taken, etc.

Per step 323, the multimedia event processor 103 correlates the response with the event data. In another step 325, the processor 103 determines to update the context data, a classification of the event data, or a combination thereof based on the response. It is noted therefore, that the one or more models may be refined based on the continuous updating of event data as well as the associated response data. This may increase the tag generation capabilities of the processor 103 as well as increase the response capabilities of the processor 103 in handling community events and emergencies.

Figure 4:
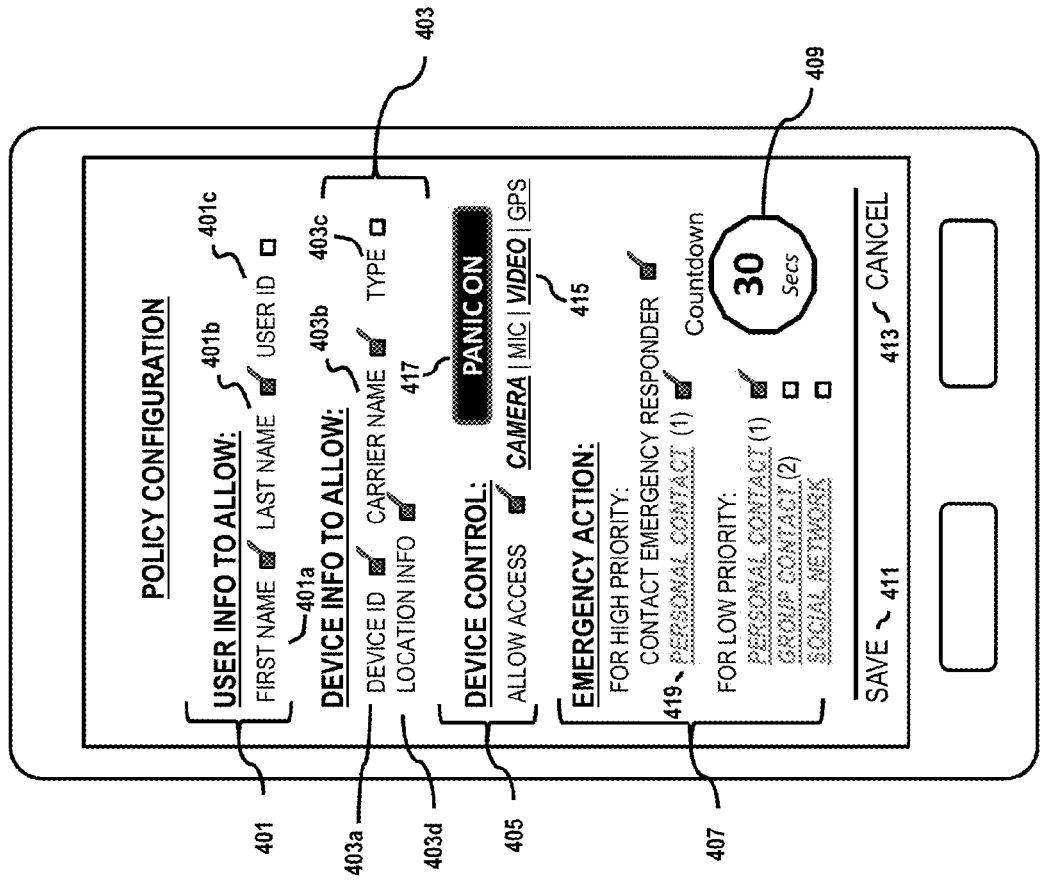
FIG. 4 is a diagram of a user interface for configuring a policy for managing the sharing and aggregating of event data by a wireless device, according to one embodiment.

FIG. 4 is a diagram of a user interface for configuring a policy for managing the sharing and aggregating of event data by a wireless device, according to one embodiment. For the purpose of illustration, the user interface 401 of a device 403 is described with respect to the exemplary execution of the multimedia event processor of FIG. 1. By way of example, the multimedia event processor 103 facilitates interaction with the user devices 101a-101n to enable establishment of various policy and control settings. Policy and control settings include the following: settings 401 for affecting what user information is allowed to be shared with contacts, settings 403 for affecting what device information is allowed to be shared with contacts, settings 405 for allowing multimedia processor and/or $3^{rd}$ party control over various capture tools of the device and settings 407 for enabling one or more response actions. Notably, settings 401 can include a first name field 401a, a last name field 401b, and a user ID field 401c. Regarding the settings 403 relating to the device, the following fields can be specified: device ID 403a, carrier name 403b, type 403c, and location information 403d. It is contemplated that user preferences/policies can be stored on the device, in the network, or a combination thereof.

The user information to allow settings 401 include one or more checkboxes for selecting/deselecting the sharing of first name, last name and user identifier information. Under the present scenario, user selection of the checkboxes corresponding to the first name and last name enables this data to be shared with contacts, including emergency responders such as police and fire professionals. The device information to allow settings 403 include checkboxes for selecting/deselecting the sharing of a device identifier, carrier name, device type and location information for the device. Under the present scenario, user selection of the checkboxes corresponding to the device identifier, carrier name and location information enables this data to be shared with contacts.

The device control settings 405 include a checkbox for selecting whether or not to allow access to various capture tools of the device. In addition, the settings include a "panic" activation button 417 for toggling the panic button feature on or off. For the present scenario, the panic button is active (ON). For example, "Panic Button" behavior may involve a college student walking home at night and is approached by a group of menacing strangers; also, a "Keep-Alive/Dead-man switch" can be configured using this panic button (e.g., setting for "If I'm not home by 11 PM, I am in trouble"). Also, user selection of the 'Allow Access' checkbox enables the multimedia event processor to access and/or control the various capture tools of the device. It is noted that this includes determining device and/or user context information. Upon selection of this option, the user is also presented with various activation links, i.e., link 415, for enabling selection of specific capture tools and/or sensors to allow. The list includes device control over a camera, microphone, video recorder 415 and GPS sensor, with links for the activated tools being presented to the display in highlighted form. Conversely, links corresponding to disabled capture tools are presented to the interface without highlight.

The emergency action settings 407 include checkboxes for selecting/deselecting a response to a high priority event, including whether to contact an emergency responder (e.g., police) or personal contact as established by the user. Under the present scenario, user selection of the checkboxes corresponding to the emergency responder and personal contact enables the multimedia event processor to generate and direct event notifications to these contacts based on high priority events. For low priority events, user selection of the personal contact (e.g., the same contact) limits the multimedia event processor 103 to routing event notifications to only the personal contact. This is at the exclusion of a group contact and social network contact corresponding to the sending of a particular group of contacts or select number of contacts of the user's social network.

As indicated by this example, the event notifications are transmitted to exclude user identification data and the device type per settings 401 and 403. The personal contact may also be adapted by selecting the personal contact link 419. The personal contact link enables the user to access an online, stored, or shared database featuring the users various contacts. In certain embodiments, the link 419 may also present various data entry fields for defining a contact. Next to the link 419 is an indicator, i.e., "(1)", for conveying the number of contacts currently designated by the user relative to the contact type.

A user configurable countdown timer 409 is also presented for regulating the pace of user response to inquiries or messages received from the multimedia event processor 403. By way of example, the user selects an elapse time (e.g., 30 seconds), in which they are required to respond to event notifications, requests/inquiries from the processor 103, etc.

Failure to comply within the designated time period enables the multimedia event processor to assume control of the device and/or various capture tools thereof, trigger the calling of a different contact as queued, trigger the calling of an emergency responder, etc. The countdown timer 409 may also feature an adjustable frequency setting for indicating a number of retry attempts.

Once the user has made their selections, they may select a "SAVE" action button 411 to upload and save the settings to the multimedia event processor 103. Alternatively, they can select the "CANCEL" action button 413 to cancel the settings.

FIG. 5A is a diagram depicting an interaction between a multimedia event processor and one or more user devices, according to one embodiment. For the purpose of illustration, the interaction 500 is presented with respect to a use case of device users 502 and 504 capturing event data corresponding to a vehicle 501 involved in an accident. The devices 503 and 511 of the users, corresponding to a cell phone and tablet computer respectively, are equipped with various data capturing tools. It is noted that the users are within a relative proximity of the same location, place, person, object, or premise that constitutes the event data.

Under this scenario, user 502 captures image data 509a of the vehicle 501 from their particular vantage point at a time of 1:31:09 pm ON 10/1/XX. Likewise, user 504 captures image data 509b from their vantage point as well as sound data 509c corresponding to the event at a time of 1:35:39 pm on 10/01/XX. In response to the capture of the data or direct activation of a panic button by at least one of the user devices 503 and 511, the multimedia event processor 517 is caused to aggregate the event data 509a-509c. In addition to the event data 509a-509c, the multimedia event processor 517 also captures context information associated with the various users 502 and 504 and/or the user devices 509a-509c.

By way of example, the vehicle 501 accident occurs on 10/01/XX at a location corresponding to 123 N. Mekail Drive, Chicago, Ill. 60616. A context module at each device 503 and 511 is configured to generate a specific set of geographic coordinates for each of the respective devices 503 and 511 within proximity of the accident. For location 507 of device 503, the context module determines global positioning coordinates expressed in a minutes/decimal format, where the longitude is N30 17.477 and latitude is W97 44.315. The location 515 of device 511 corresponds to a longitude N30 17.471 and latitude is W97 44.314.

Once the event data and context information is received, the multimedia event processor 517 processes the data in various ways. This includes analyzing the event data 509a-509c using various data recognition tools and analysis techniques. In addition, the context information 507 and 515 is analyzed. By way of example, analysis of the image 509b and audio file 509c results in generation of the tags "Accident," "Crash," "Car" and "Heavy Traffic." Generation of the tags is also dependent on the context information, i.e., the tag "Heavy Traffic" may be based on a correlation between the time associated with the event and historically high traffic rates at this time of day. Traffic status may also be provided by external sources like traffic cameras or traffic services available via the Internet.

It is noted also that the multimedia event processor may perform its tag generation analysis based on the timing of aggregation of event data 509a-509c from respective devices 503 and 511. As such, the tags generated for one set of event data 509b and 509c from device 511 may also be based on analysis of the event data provided by the other device 503. Hence, tag generation for differing sets of event data may be performed by the processor 517 based on a determined correlation between the event data, a determined similar time of aggregation of the event data (e.g., the event data 509a-509c is received within X seconds of one another), or a combination thereof. As noted before, the multimedia event processor 517 is able to determine a match between the different event data 509a-509c based, at least in part, on commonality between the time, location (coordinates) and date (e.g., context information) to within a predetermined threshold of variance.

Figure 5B:
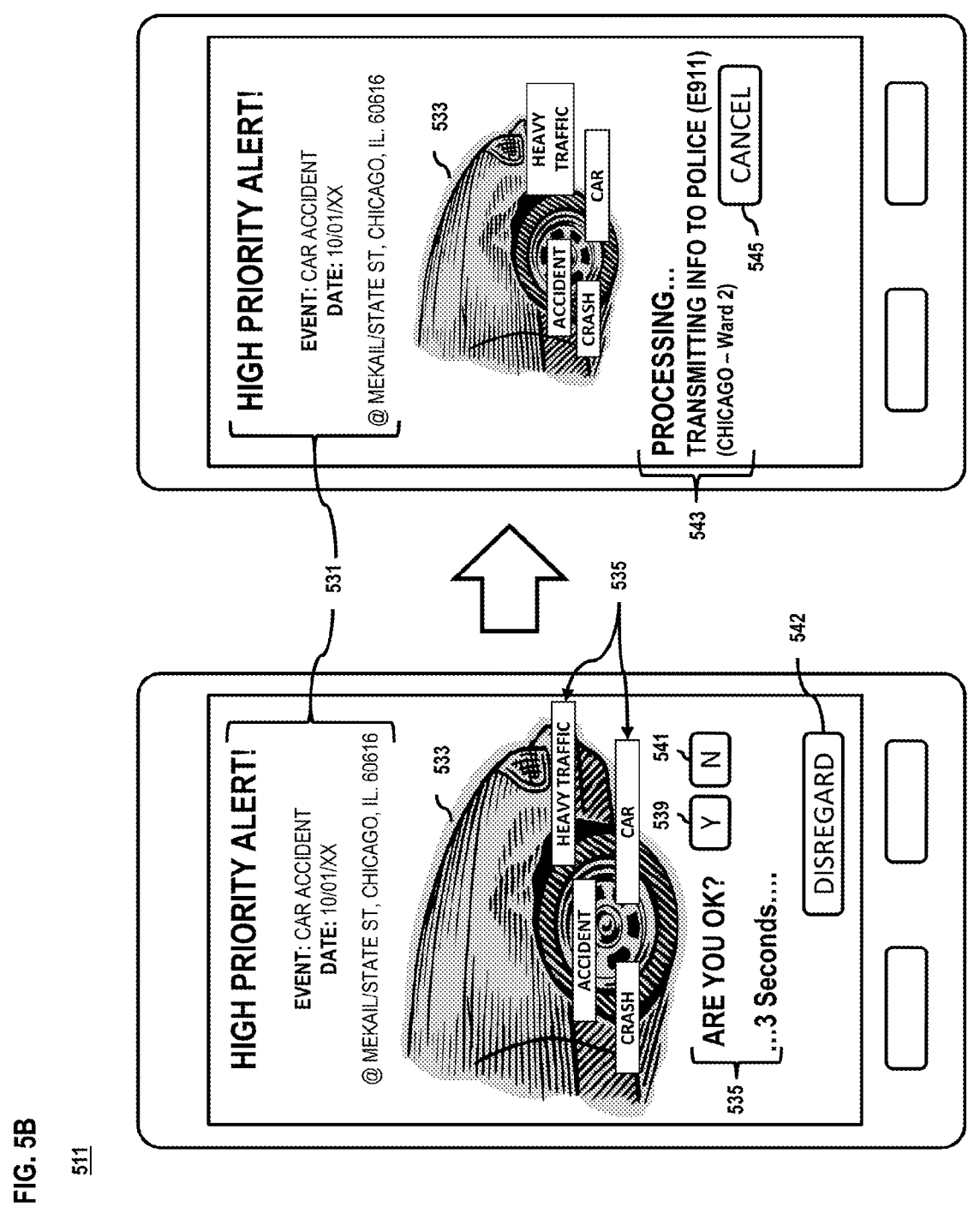

FIG. 5B is a diagram of a user interface for enabling user interaction with the multimedia event processor, according to one embodiment. For the purpose of illustration, the figure is described from the perspective of the aforementioned exemplary use case. Under this scenario, various exemplary response actions pursuant to analysis of aggregated event data by the processor 517 are shown.

The multimedia event processor 517 provides feedback to the user 504 of its analysis of the provided event data 509b and 509c and corresponding context information 515. Having processed the information and that of others (e.g., user 502), a level of severity of High Priority is determined. Also, processing of the various tags with respect to one or more event models enables the processor 517 to determine an event type of "Car Accident." Still further, having aggregated the context information for all event data 509a-509c, the relative location of the accident is determined to occur at or near an intersection of Mekail and State Street in Chicago, Ill. These results 531 are presented to the device 511 of the user 504, along with a reference 533 of the image data 509b upon which the results are based. In addition, the one or more tags generated with respect to the aggregated event data correlated to the event "Car Accident" are displayed, i.e., tags 535. It is noted that presentment of the results 531, reference 533 and tags 535 serve as a means of validating receipt of the data by the multimedia event processor. Furthermore, rendering of this information to the display of the device 511 serves as confirmation of the processor's interpretation of the event as well as a confirmation of the determined response action to be executed based on the event type (e.g., Car Accident=High Severity). While not shown, similar information is rendered to the display of other devices associated with the tagged event data, i.e., device 507 for user 502. Processor 517, according to certain embodiments, may deliver events to a human agent for follow up in the case that the original event recipient may not be in a position to see a display or interact with it.

A user response option message 535 is also presented via the interface. By way of example, in the case where the user 505 is the driver 505 of the vehicle 501, a message may be presented for querying the status of the user. A countdown message may also be presented for indicating an amount of time the user 505 has before the multimedia event processor 517 executes an emergency response action. The user has the option of selecting a "Y" or "N" action, button 539 and 541 respectively, for providing a Yes or No response respectively to the multimedia event processor 517. In the case of a Yes response, the multimedia event processor 517 may delay performance of any response actions for a predetermined amount of time (per the policy settings). The user may also be presented with a "DISREGARD" action button 542 for indicating that no further action on the part of the multimedia event processor 517 is required by the user 505.

In the case where the user provides no response and the countdown period elapses, the multimedia event processor 517 performs a response action. By way of example, the processor 517 generates and transmits a notification message to the local police department regarding the event. The notification message will include only that data agreed upon by the user to be shared with the particular contact in question. Hence, a policy setting of user 505 for restricting the name of the user results in sharing of only other pertinent details, such as the results information 531, the image data 533, etc.

As a result of the response action, the multimedia event processor 517 causes the user interface at device 508 to present a message 543 for specifying the response action undertaken. Under this scenario, the message indicates that a message is being sent to the police department. The message 543 further indicates the specific police department to which the message is being routed/dispatched, which in this case is Chicago—Ward 2. Routing of the message to this specific emergency responder is based, at least in part, on the context information. The user may cancel execution of this response action by selecting a "CANCEL" action button 545.

It is contemplated, in other embodiments, that policy settings may be established for enabling the retrieval of sensitive data from a designated data source relative to the determined event type. By way of example, user 505 may establish a policy setting for enabling retrieval of auto insurance policy information or medical records from their auto insurance carrier and medical provider respectively. Under this scenario, when an event type corresponding to Car Accident is determined, this additional data may be retrieved by the multimedia event processor and shared with the various contacts that are to be notified. Thus, if user 505 suffers from diabetes and is subject to the vehicle accident, an emergency medical team may be notified of this need in advance. Similarly, accident witness information for users 502 and 504 can be retrieved, with information required to generate a police report being automatically extracted and populated in advance for use by the responding officer. Still further, auto policy information may be directed/routed to the respective opposing insurance companies of user 505 and any other driver involved in the accident accordingly to expedite claims notification and processing.

With regard to the above described examples of FIGS. 5A and 5B, it is noted that the exact location of the vehicle 501 may or may not be determined depending on the amount of information aggregated or availability of additional information regarding the event data. By way of example, the event location may be extrapolated from the context information to a granularity of street intersections (e.g., @ Mekail/State Street, Chicago, Ill. 60616). As another example, a finer granularity may be determined based on advanced analysis of the image 509b or sound 509c data, including determining landmarks, evaluating sound signals, cross referencing of the data against surveillance cameras, etc. Additionally, the use of technologies including augmented reality can be used to augment the view of the accident scene in FIG. 5A using streaming image recognition to, for example, identify precise location of relevant information in the environment (e.g., location of car or cars involved in an accident) and overlays of information on the scene (e.g., year, make, model, owner, insurance company etc. of a vehicle involved in an accident) in real-time.

The exemplary techniques and systems presented herein enable one or more contacts to be notified on the basis of aggregated event data. One advantage of the exemplary system as presented herein includes enabling the easy capture, classification, prioritization and dispatching of a variety of community events requiring significantly reduced manual effort. By way of example, the multimedia event processor may exploit the use of various web based processing techniques, including Semantic web technology, Resource Description Framework (RDF) protocols, Web Ontology Language (OWL), and the like.

Another advantage includes enabling the real-time transmission of event data and contact information to emergency responders while further supporting continuous updating and refining of event details and actions. By way of example, a knowledge base may be maintained for enabling the ongoing and subsequent analysis of events to support response action improvement, event classification improvement, situational/event model development and the like. This refinement process may be rapidly engaged per the continuous aggregation of event data from a plurality of different device users; in effect increasing the pace of accumulation of data points maintained in the knowledgebase. As yet another advantage, the user may establish various settings for affecting the response action to be automated by the system, including information privacy settings, message routing settings, workflow settings, device control permissions and other policies.

The processes described herein for enabling event notifications to be directed to one or more contacts based on the acquiring of common event data by one or more wireless devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
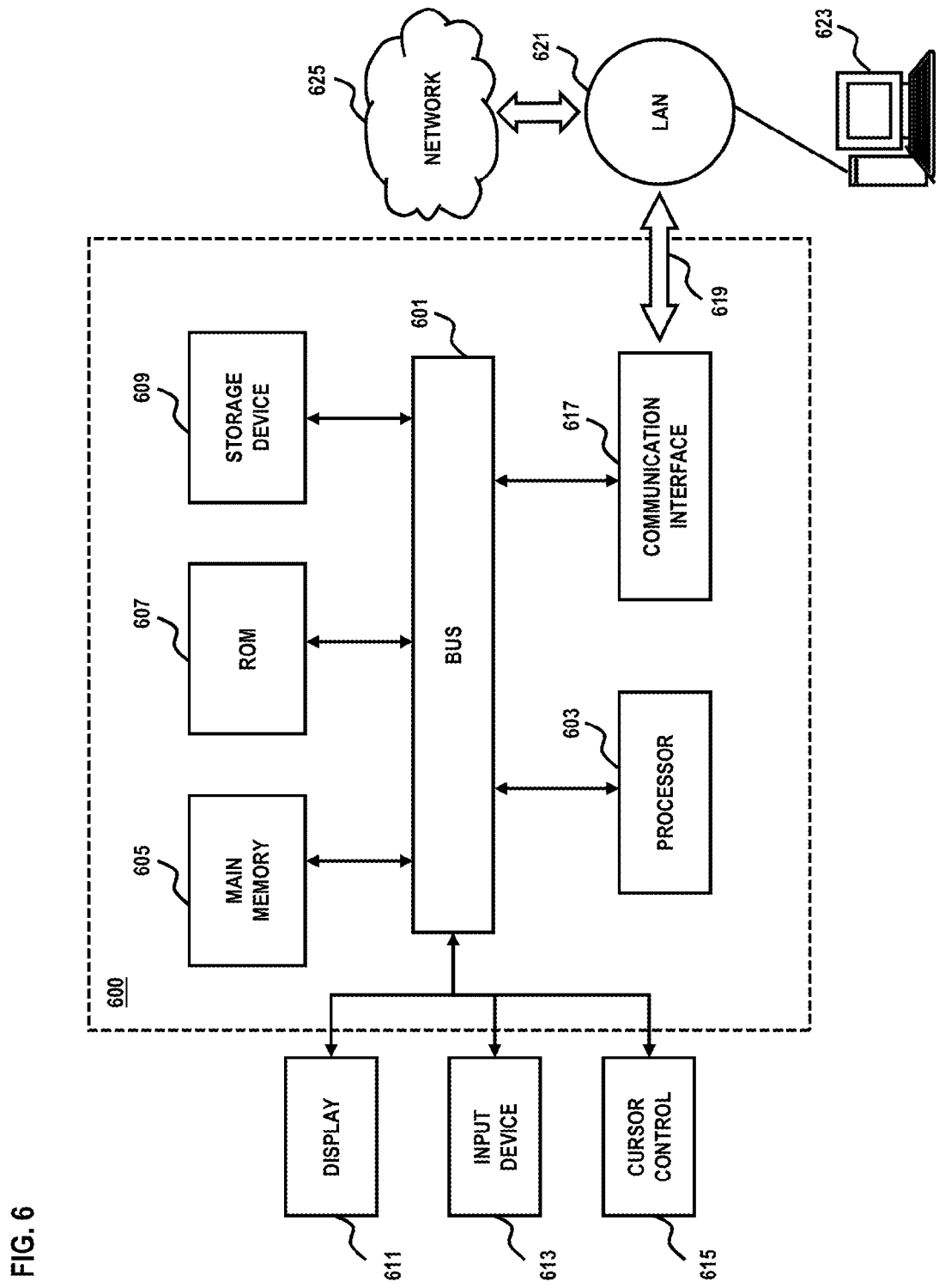
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a touch screen, microphone, or keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 4 and 5B, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to enable event notifications to be directed to one or more contacts based on the acquiring of common event data by one or more wireless devices as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling event notifications to be directed to one or more contacts based on the acquiring of common event data by one or more wireless devices.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable event notifications to be directed to one or more contacts based on the acquiring of common event data by one or more wireless devices. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving event data corresponding to an event from a mobile device, wherein the event data includes audio data, and one or more of image data and video data;
    retrieving from the mobile device context data associated with the mobile device;
    analyzing the context data, the audio data and the one or more of the image data and video data for determining a tag for describing the event data,
    wherein analyzing the audio data comprises comparing the audio data against known sound data, and
    wherein analyzing the one or more of the image data and the video data comprises image recognition processing;
    associating the event data with the tag;
    classifying the event data as corresponding to a level of severity based on the audio data, and on one or more of the tag and a volume of all event data for a given geographic region for a given time range;
    anonymizing the event data with respect to the mobile device and any associated user account;
    storing the anonymized event data among a plurality of anonymized event data; and
    determining a target destination for transmission of a notification message, the event data, or a combination thereof based on the classification, the context data, or a combination thereof.

2. A method according to claim 1, wherein the context data includes location information of the mobile device, status information of the mobile device, timing information corresponding to the event data, user information corresponding to a user of the mobile device, activity information corresponding to a user of the mobile device, or a combination thereof.

3. A method according to claim 1, wherein the classifying further comprises:
receiving other event data corresponding to the event from another mobile device;
correlating the event data and the other event data based on the tag; and
aggregating the event data with the other event data to generate a composite model of the event based on the correlation.

4. A method according to claim 1, wherein the level of severity corresponds to a plurality of priorities for responding to the event.

5. A method according to claim 1, further comprising:
transmitting a notification message to an emergency services provider, a private emergency contact, a local government representative, a public contact, one or more members of a social network, a community, or a combination thereof.

6. A method according to claim 1, further comprising:
receiving a response to the notification message from the target destination;
correlating the response with the event data; and
determining to update the context data, a classification of the event data, or a combination thereof based on the response.

7. A method according to claim 1, further comprising:
generating a triggering message based on the classification of the event data.

8. A method according to claim 1, wherein the event data further includes textual data, numeric data, or a combination thereof.

9. A method according to claim 1, wherein the target destination corresponds to a phone number, e-mail address, universal resource identifier (URI), electronic communication handle, or a combination thereof of an emergency services provider, a private emergency contact, a local government representative, a public contact, a member of a social network, a member of a community, or a combination thereof.

10. An apparatus comprising:
at least one processor; and
at least one memory including computer program code for one or more programs,
the at least one memory and the computer program code configured to, with the at least one processor, cause the apparatus to perform at least the following,
receive event data corresponding to an event from a mobile device, wherein the event data includes audio data, and one or more of image data and video data;
retrieve from the mobile device context data associated with the mobile device;
analyze the context data, the audio data and the one or more of the image data and video data for determining a tag for describing the event data,
wherein analyze the audio data comprises compare the audio data against known sound data, and
wherein analyze the one or more of the image data and the video data comprises image recognition processing;
associate the event data with the tag;
classify the event data as corresponding to a level of severity based on the audio data, and on one or more of the tag and a volume of all event data for a given geographic region for a given time range;
anonymize the event data with respect to the mobile device and any associated user account;
store the anonymized event data among a plurality of anonymized event data; and
determine a target destination for transmission of a notification message, the event data, or a combination thereof based on the classification, the context data, or a combination thereof.

11. An apparatus according to claim 10, wherein the context data includes location information of the mobile device, status information of the mobile device, timing information corresponding to the event data, user information corresponding to a user of the mobile device, activity information corresponding to a user of the mobile device, or a combination thereof.

12. An apparatus according to claim 10, wherein the apparatus is further caused to:
receive other event data corresponding to the event from another mobile device;
correlate the event data and the other event data based on the tag;
aggregate the event data with the other event data to generate a composite model of the event based on the correlation.

13. An apparatus according to claim 10, wherein the level of severity corresponds to a plurality of priorities for responding to the event.

14. An apparatus according to claim 10, wherein the apparatus is further caused to:
transmit a notification message to an emergency services provider, a private emergency contact, a local government representative, a public contact, one or more members of a social network, a community, or a combination thereof.

15. An apparatus according to claim 10, wherein the apparatus is further caused to:
receive a response to the notification message from the target destination;
correlate the response with the event data; and
determine to update the context data, a classification of the event data, or a combination thereof based on the response.

16. An apparatus according to claim 10, wherein the apparatus is further caused to:
generate a triggering message based on the classification of the event data.

17. An apparatus according to claim 10, wherein the event data further includes numeric data, textual data, or a combination thereof.

18. An apparatus according to claim 10, wherein the target destination corresponds to a phone number, e-mail address, universal resource identifier (URI), electronic communication handle, or a combination thereof of an emergency services provider, a private emergency contact, a local government representative, a public contact, a member of a social network, a member of a community, or a combination thereof.

* * * * *